US005305960A

United States Patent [19]

Healey

[11] Patent Number: 5,305,960

[45] Date of Patent: Apr. 26, 1994

[54] AUTO ENGINE FIRE CONTROL METHOD

[76] Inventor: Edmund T. Healey, 619 Remmert Pl., Baldwin, N.Y. 11510

[21] Appl. No.: 132,190

[22] Filed: Oct. 6, 1993

[51] Int. Cl.$^5$ ........................ B25J 11/00; A47F 13/06

[52] U.S. Cl. .................................... 294/1.1; 294/19.1; 294/26

[58] Field of Search ......................... 294/1.1, 19.1, 26; 7/100; 81/15.9, 488; 70/240, 241; 292/DIG. 14, DIG. 25; 169/46, 62

[56] References Cited

U.S. PATENT DOCUMENTS 2,027,009 1/1936 Wyscaver ............................ 81/15.9
2,688,266 9/1954 Knudsen et al. ...................... 81/15.9
3,788,168 1/1974 Steinmann, Jr. ............... 294/19.1 X
4,873,897 10/1989 Williams ............................. 81/15.9
4,882,954 11/1989 Selby ................................... 81/15.9

*Primary Examiner*—Dean J. Kramer

[57] ABSTRACT

Using a hook, the cable which, in non-emergency circumstances is used to unlatch an auto hood, is engaged and pulled to release the hood so that a fire fighter has access preparatory to extinguishing an auto engine fire, more safely and more effectively than the heretofore method requiring a forceful prying open of the auto hood.

1 Claim, 1 Drawing Sheet

AUTO ENGINE FIRE CONTROL METHOD

The present invention relates to improvements in safety and effectiveness in extinguishing an auto engine fire, in obviating the heretofore primary obstacle, namely providing the fire fighter(s) access to the fire.

A fire in the engine of an auto occurs, as might be surmised, under a hood closed over the burning engine, thus requiring prompt release of the hood so the fire can be extinguished before spreading, causing an explosion, or presenting other dangers to the fire fighters. Current practice is to wedge a crowbar or like tool between the edge of the hood and the edge bounding the opening in the car receiving the hood and using leverage to force or pry the hood open. Typically this requires snapping the hook that latches the hood in its closed position, such that the hood thusly released is able to be raised and the fire fighter provided access to the fire.

In contrast, and in accordance with the present inventive method, a prying force is not used to release the hood, and instead the hood is unlatched but, of course, not using the unlatching handle normally employed by the driver for this purpose since the unlatching handle is within the car and thus not usable in an emergency fire situation. Unlatching the hood, rather than prying it open, is less tedious and time-consuming, and thus contributes to extinguishing the engine fire before dangerous conditions occur.

Broadly, it is an object to overcome the foregoing and other shortcomings of a forced release of a closed or blocking hood over an auto engine fire. More particularly, it is an object to bypass the unlatching handle, but nevertheless unlatch the hood in a facilitated and safer procedure than that currently in use, all as will be subsequently explained in detail.

The description of the within inventive method which follows, together with the accompanying drawings, should not be construed as limiting the invention to the example shown and described, because those skilled in the art to which this invention appertains will be able to devise other forms thereof within the ambit of the appended claims.

Figure 1:
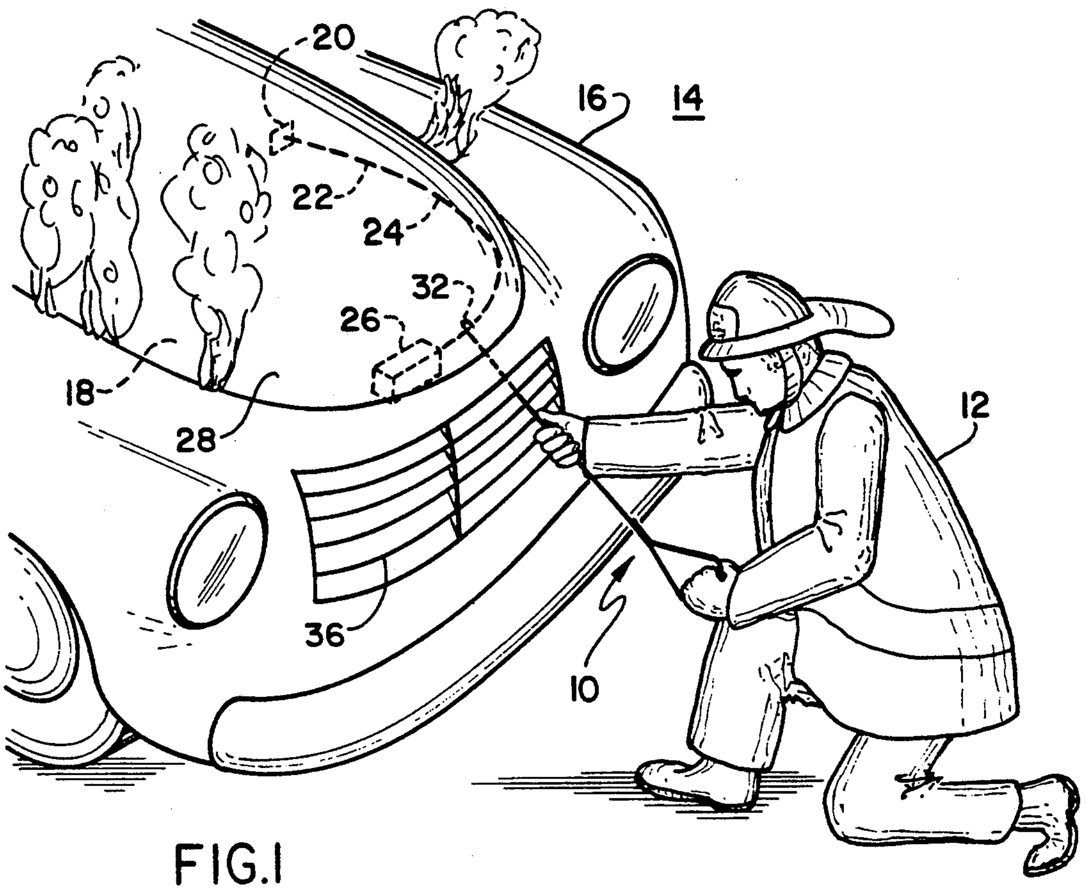
FIG. 1 is a perspective view illustrating the practice of the within inventive auto hood unlatching method preparatory to extinguishing an auto engine fire.
Figure 2:
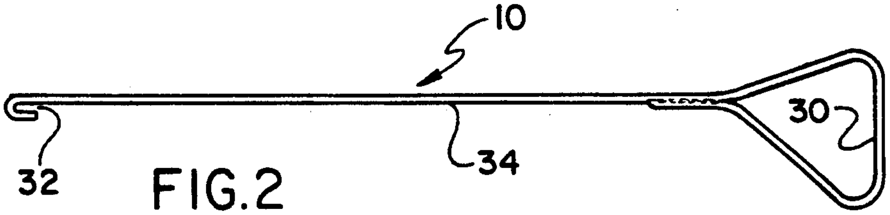
FIG. 2 is an isolated view of an unlatching tool used in the practice of the illustrated method of FIG. 1.
Figure 3:
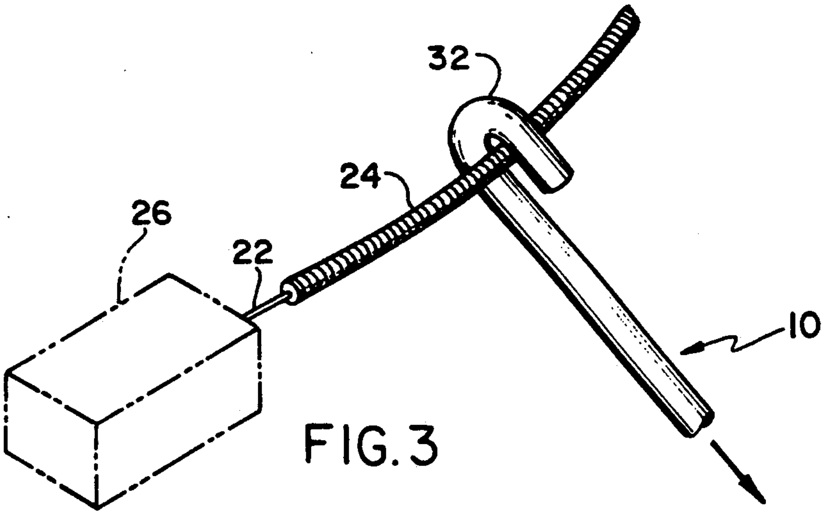
FIG. 3 is a partial close-up perspective view of the tool of FIG. 2 showing a cooperative operative position of an end hook on the FIG. 2 tool and an auto hood unlatching cable.

The present invention contemplates use of a hook 10, the structural details of which will be subsequently described, used as shown in FIG. 1 by a fire fighter 12 at the scene 14 of an engine fire within a vehicle 16. Hook 10 replaces a crowbar or like tool which, according to current prior art practice, is used to force open a closed auto hood 28, the hook 10 being used instead to unlatch the hood 28. Thus, unlatching instead of attempting a forced opening of the hood 28, is the primary benefit of the within inventive method, along with increased safety to the fire fighter 12, and other benefits.

It is well known that, on most vehicles, access to the engine compartment 18 is normally made by pulling a hood-release handle 20 which activates a wire core 22 within a cable 24. Wire 22 is connected to the primary hood-latching hook or lock 26 which releases hood 28 when handle 20 is pulled. Cable 24 is customarily mounted along the engine compartment wall on the driver's side of the vehicle, terminating at handle 20 typically located within reach of the driver adjacent the driver's seat. After pulling handle 20 and releasing lock 26, a properly positioned person at the front of the vehicle 16 then manually releases a safety hook (not shown) to achieve a fully opened position of hood 28, and, in this manner, gain access to the engine compartment 18.

In an emergency situation involving a car engine fire it is necessary to unlatch the hood 28 and gain access to the engine compartment 18. Usually release handle 20 is not accessible because the vehicle is locked and/or filled with fire, fumes and smoke. As above noted, currently use is made of a crowbar type tool to break the hold between the locking hook 26 and hood 28 and cause the release of the hood 28. This operation is time consuming at best, thereby prolonging a very hazardous situation.

In contrast, the hood-releasing method of the present invention makes use, not of a crowbar, but of a tool 10 preferably made of ¼" diameter steel rod construction material, having a shaped handle 30 at one end, a hook 32 formed at its opposite end, and a rod-like body 34 connected therebetween of a selected length, preferably 21" from the end of handle 30 to the hook 32.

In emergency use for a car engine fire, it is contemplated that a fire fighter 12 will insert the tool 10 through the car grill 36 at a location along the known path of the cable 24, namely along the driver's side in spanning relation from the handle 20 to the off-center location of the hook lock and, manipulating the handle 30, will be able to effectively engage the cable 24 with the hook 32. It should be noted that the length selected for the tool body 34 should be effective to locate the fire fighter 12 at a "safe" distance from the fire 12. On some vehicles access to cable 24 cannot be gained through the grill 36. In this case, cable 24 may be reached with tool 10 from underneath compartment 18 just behind the car radiator (not shown) on the driver's side. Once the cable 24 is engaged, a firm pulling action will cause a release of the hood 28.

Underlying the present invention, in addition to the favorable circumstances already mentioned which contribute to the successful use of the within inventive tool 10, is the recognition that a nonsliding wire core 22 within the cable covering 24, if necessary, can operate the latch 26. That is, the cable 22 can be pulled from its point of connection adjacent the latch hook 26, and said freed cable 24 with the wire core 22 then pulled to operate the latch. In other words, sliding movement of the wire core 22 within the cable 24, according to the usual operating mode of the latching mechanism is, of course, not required in the emergency circumstances of a car engine fire. In some instances, of course, the cable cover 24 may rupture or be consumed by fire, and the hook will directly engage the wire core 22 and cause unlatching through sliding movement of the wire core per se.

While the apparatus for practicing the within inventive method, as well as said method herein shown and disclosed in detail, is fully capable of attaining the objects and providing the advantages hereinbefore stated, it is to be understood that it is merely illustrative of the presently preferred embodiment of the invention, and that no limitations are intended to the detail of construction or design herein shown other than as defined in the appended claims.

What is claimed is:

1. A method used preparatory to extinguishing an auto engine fire to unlatch an auto hood from its position in closed relation over said auto engine, said hood-unlatching method comprising the steps of locating in a driver's side off-center location in a grille of said auto an opening to gain access beneath said latched hood, using an elongated tool having a gripping handle at a proximal end and a configuration in the shape of a hook at a distal end by projecting said tool hook through said grille access opening to a position known to be adjacent a cable connected in spanning relation between a hood-latching mechanism and a pulling handle within reach of a driver intended for use in normally operating said hood-latching mechanism, establishing hooking engagement between said tool hook and said cable, and exerting a yanking force at said tool gripping handle to cause a cable movement which operates said hood-latching mechanism while bypassing normal use of said cable pulling handle, whereby said unlatched hood is released from its closed position over said engine fire at a safe distance therefrom.

* * * * *